(12) United States Patent
Jacquier

(10) Patent No.: US 6,264,324 B1
(45) Date of Patent: Jul. 24, 2001

(54) SPECTACLE FRAME

(75) Inventor: Hervé Jacquier, Joinville-le-Pont (FR)

(73) Assignee: LOGO, Joinville-le-Pont (FR)

( * ) Notice: Subject to any disclaimer, the term of this patent is extended or adjusted under 35 U.S.C. 154(b) by 0 days.

(21) Appl. No.: 09/489,824

(22) Filed: Jan. 24, 2000

(30) Foreign Application Priority Data

Jan. 25, 1999 (FR) .................................................. 99 00773

(51) Int. Cl.[7] .................................................. G02C 11/02
(52) U.S. Cl. ................................ 351/51; 351/44; 351/158
(58) Field of Search ................................. 351/51, 52, 44, 351/158

(56) References Cited

U.S. PATENT DOCUMENTS

| | | | |
|---|---|---|---|
| 2,565,362 | * 8/1951 | Eloranta | 351/49 |
| 3,867,020 | * 2/1975 | Braunhut | 351/49 |
| 3,981,569 | 9/1976 | Morgan | 351/47 |
| 4,848,889 | 7/1989 | Shaw | 351/51 |
| 5,652,635 | 7/1997 | Kirschner | 351/52 |
| 6,102,540 | * 8/2000 | Chen | 351/52 |

FOREIGN PATENT DOCUMENTS

| | | | |
|---|---|---|---|
| 3-238418 | * 10/1991 | (JP) | 351/52 |
| 9823994 | 6/1998 | (WO) . | |

* cited by examiner

*Primary Examiner*—Huy Mai
(74) *Attorney, Agent, or Firm*—Young & Thompson

(57) ABSTRACT

A spectacle frame having an esthetic or amusing character because of a mobile decorative part includes at least one mobile element having a decorative part and a transparent optical part covering an opening and the mobile element is rotatably mounted in front of the opening. The mobile element can have an oval contour.

12 Claims, 2 Drawing Sheets

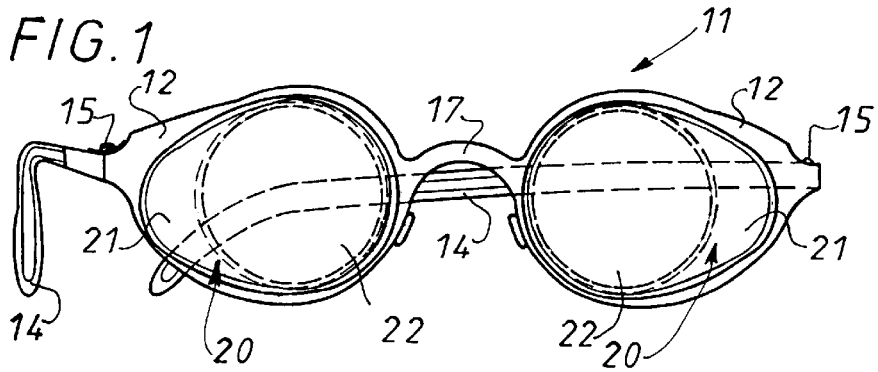
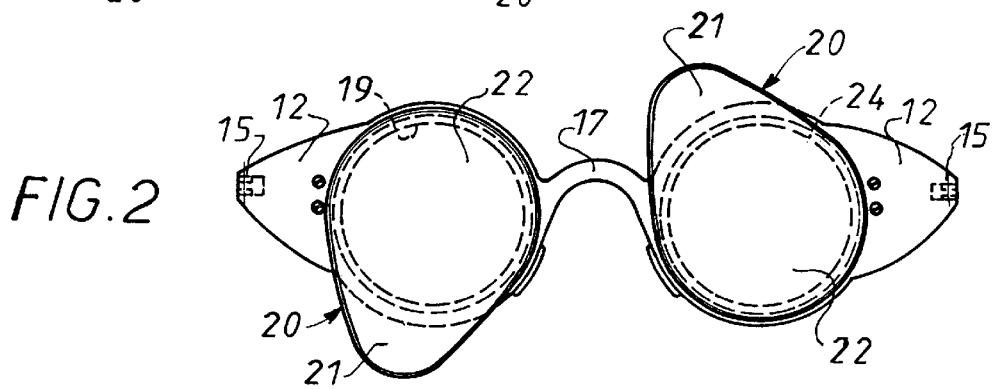
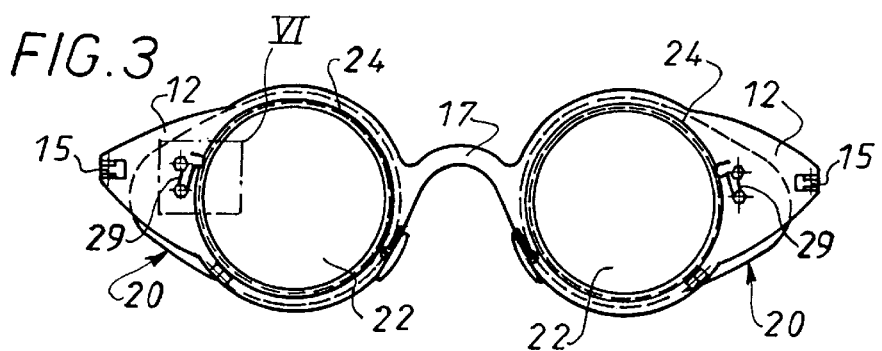
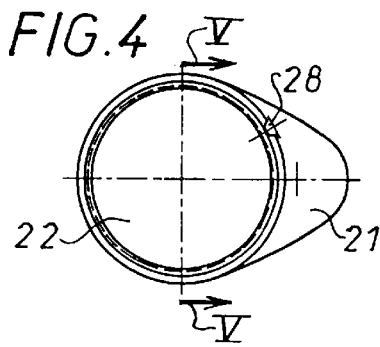
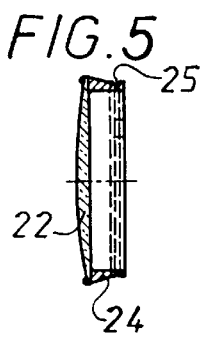
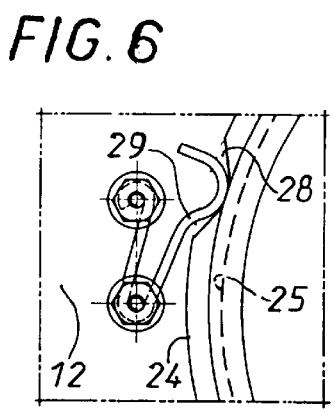

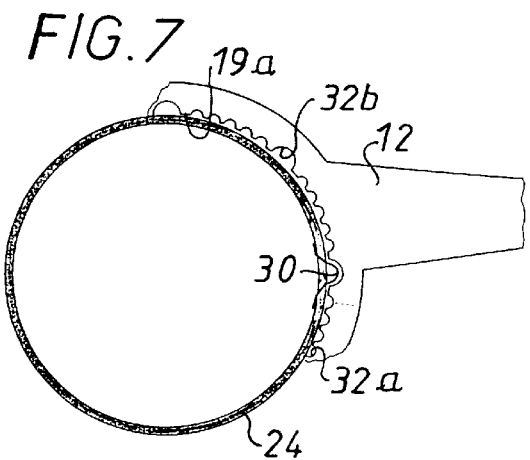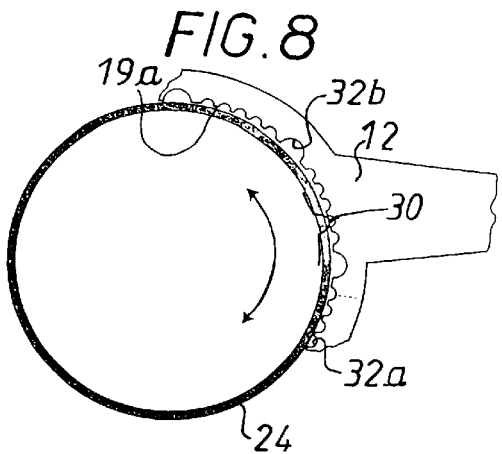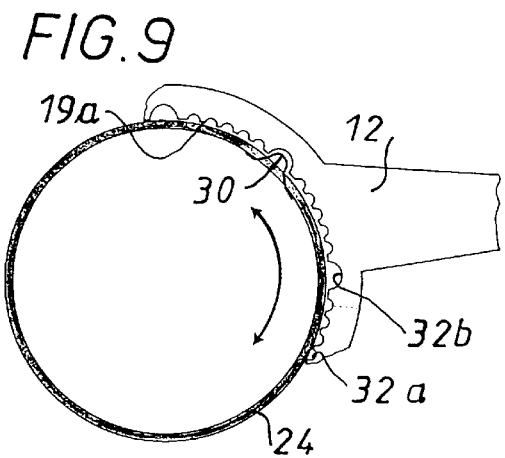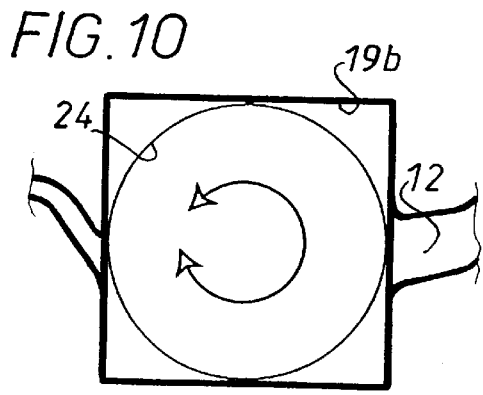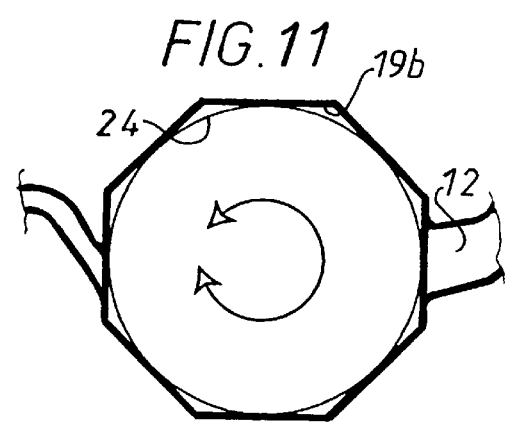

SPECTACLE FRAME

BACKGROUND OF THE INVENTION

1. Field of the Invention

The invention relates to a spectacle frame and more particularly to a frame having an esthetic and/or amusing character because of a mobile decorative part.

2. Description of the Prior Art

The shape of a spectacle frame has become very important to the wearer. All kinds of more or less expressive and esthetic frames have been proposed, some even having an intentionally provocative and/or amusing character.

For example, PCT document WO 98/23994 describes a frame in which each surround or "rim", i.e. the part in which the lens is mounted, incorporates an ornamental flat ring surrounding and emphasizing the lens. The ring is mounted so that it can be turned in a groove on the surround. Some parts of the ring are hidden from the front. The ring has a number of areas of different color or appearance. Adjusting the position of the ring relative to the concealing parts of the surround changes the esthetic effect of the frame.

However, the ring merely emphasizes the lens that it surrounds and the variations in appearance that can be obtained in this way are therefore somewhat limited. This system does not provide a truly "expressive" frame whose appearance can be modified within wide limits. The invention achieves this objective.

SUMMARY OF THE INVENTION

To be more precise, the invention consists in a spectacle frame including two surrounds joined by a bridge, each surround having an opening, at least one mobile element having a decorative part and a transparent optical part covering one of the openings, and mounting means whereby the element is rotatably mounted in front of the opening.

The transparent optical part can form a lens, i.e. a non-correcting lens, for example a solar protection lens, and/or a correcting lens, for example a single-vision lens.

In a preferred embodiment of the invention the decorative part and the optical part cannot be dissociated from each other; they are made in one piece from the same transparent material.

Embodiments of the invention include particularly noteworthy ones having a particularly strong esthetic and amusing character, for example when the mobile element has a non-circular shape, accounting for at least part of its decorative character. This is because the non-circular element can be oriented in any direction, independently of the adjacent element. A highly unusual effect is obtained if the mobile element has an ovoid contour profile. In this case, if the elongate part of the ovoid contour profile element extends the surround laterally, i.e. globally horizontally, the frame takes on a relatively conventional and unremarkable appearance. On the other hand, as soon as at least one element is turned relative to this "neutral" position the frame takes on a provocative and/or amusing appearance. The expressive possibilities can be varied by modifying the orientation of either element whenever required.

The aforementioned mounting means may comprise a ring defined on the rear face of the mobile element. The ring has an annular groove in it in which said element is mounted so that it can turn inside the opening of the corresponding surround.

The invention will be more clearly understood and other advantageous details of the invention will become more clearly apparent in the light of the following description of a spectacle frame in accordance with the invention, which description is given by way of example only and with reference to the accompanying drawings.

BRIEF DESCRIPTION OF THE DRAWINGS

FIG. 1 is a front perspective view of a spectacle frame.

FIG. 2 is a front view of the same frame with its mobile elements in a different position.

FIG. 3 is a rear view of the spectacle frame.

FIG. 4 is a rear view of one of the mobile elements.

FIG. 5 is a view in section taken along the line V—V in FIG. 4.

FIG. 6 is a detail view to a larger scale showing the cooperation between a spring member fixed to the surround and the edge of the corresponding mobile element.

FIGS. 7 to 9 are similar detail views showing a different embodiment of the invention.

FIGS. 10 and 11 are detail views showing other embodiments of the invention.

DETAILED DESCRIPTION OF THE PREFERRED EMBODIMENTS

The spectacle frame 11 shown in the figures conventionally includes two surrounds 12, also referred to as "rims", for mounting the lenses, two temples 14 articulated by respective hinges 15 to the edge of said surrounds and a bridge 17. The bridge connects the two surrounds. Each surround includes a circular opening 19.

According to an important feature of the invention, the frame has two mobile elements 20 each of which has a decorative part 21 and a transparent optical part 22 which covers the corresponding circular opening 19 in the surround 12. To be more precise, each mobile element 20 has an optical part and a decorative part and is mounted to rotate as a whole inside the corresponding circular opening 19 by appropriate mounting means. In this example, each element includes a ring 24 on the element 20, to be more precise defined on the rear face thereof, and the ring has an annular groove 25 by means of which the mobile element 20 is mounted to rotate in the circular opening 19 of the corresponding surround.

In the example shown, the element 20 as a whole is made from a tinted transparent plastics material so that it forms a solar protection lens. There is obtained in this way a pair of sunglasses in which each element, which forms a solar protection lens, has a non-circular shape which accounts for at least part of its decorative character. In the example described, each element 20 has an ovoid contour profile.

When the elements 20 are disposed in the manner indicated in FIGS. 1 and 3, they integrate into the overall shape of the frame 11 and the impression given is relatively conventional. To facilitate placing the elements in this conventional position a lateral recess 28 on each of them, within the thickness of the ring 24, cooperates with a spring member 29 attached to the surround 12. This simple arrangement defines a predetermined reference position for the element 20, which is that shown in FIGS. 1 and 3. In any other position, the spring member 29 bears on the edge of the ring 24 and stabilizes the latter by friction in any chosen position. It is equally possible to provide a number of lateral recesses 28 distributed around the periphery of the ring 24 to define a plurality of predetermined reference positions.

As shown in FIGS. 7 to 9, the arrangement can be the converse of that previously described, i.e. the ring 24 can carry a leaf spring member 30 shaped to define a projecting boss cooperating with one or more substantially semi-circular notches 32a, 32b on the inside edge of the circular opening of the surround 12.

In this example there are two types of notch, with groups of shallow notches 32a (of which there are five, for example) between two deep notches 32b. The cooperation of the spring member 30 with the small notches produces a soft "click" that can be heard when the ring is turned from one predetermined position to another, corresponding to engagement of the member 30 in a notch 32b. In a position like this, the engagement of the member 30 in the notch produces a different and characteristic noise.

FIG. 2 shows the amusing appearance that the spectacle frame can assume as soon as one or both elements is placed in any position.

As indicated above, the optical part (like the decorative part, which is no more than a lateral extension of the optical part) is transparent but tinted to constitute a solar protection lens. The optical part can equally constitute a single-vision correcting lens. It can also constitute a tinted correcting lens, offering solar protection.

Finally, it should be noted that the surround itself can be provided with a non-circular opening 19b, for example one with the general shape of a regular polygon such as a square (FIG. 10) or an octagon (FIG. 11). The mounting means can be identical and include a ring 24 rotatably mounted by means of an annular groove in the non-circular opening, for example.

What is claimed is:

1. A spectacle frame including:

two surrounds joined by a bridge, each surround having an opening;

at least one mobile element having a decorative part and a transparent optical part covering one of said openings; and mounting means whereby said element is rotatably mounted in front of said openings, wherein said mounting means include a ring on said mobile element including an annular groove by which said mobile element is rotatable mounted in said opening of the corresponding surround.

2. The frame claimed in claim 1 wherein each surround is equipped with a mobile element.

3. The frame claimed in claim 1 wherein said optical part forms a solar protection lens.

4. The frame claimed in claim 1 wherein said optical part forms a correcting lens.

5. The lens claimed in claim 1 wherein said mobile element or each mobile element is of non-circular shape, accounting for at least part of its decorative character.

6. The frame claimed in claim 5 wherein said mobile element or each mobile element has an ovoid contour profile.

7. The frame claimed in claim 1 wherein said ring includes a lateral recess cooperating with a spring member fastened to said surround to define a predetermined reference position of said mobile element.

8. The frame claimed in claim 1 wherein said surround includes one or more notches on its inside edge adapted to cooperate with a spring member carried by said ring.

9. The frame claimed in claim 8, wherein said notches have different depths.

10. The frame claimed in claim 1 wherein each opening is circular.

11. The frame claimed in claim 1 wherein each opening has a contour of generally polygonal shape.

12. The frame claimed in claim 1 wherein said decorative part and said optical part are made in one piece from the same transparent material.

* * * * *